Feb. 23, 1926.  
J. C. HAGGART, JR  
1,574,082  
TWO-RANGE TRANSMISSION MECHANISM  
Filed May 19, 1924   3 Sheets-Sheet 1

Inventor  
John C. Haggart Jr.  
By  
Attorneys

Feb. 23, 1926. 1,574,082
J. C. HAGGART, JR
TWO-RANGE TRANSMISSION MECHANISM
Filed May 19, 1924  3 Sheets-Sheet 2

Inventor
John C. Haggart Jr,
By
Attorneys

Feb. 23, 1926.                                                    1,574,082
            J. C. HAGGART,
      TWO-RANGE TRANSMISSION MECHANISM
           Filed May 19, 1924        3 Sheets-Sheet 3

Inventor.
John C. Haggart Jr.
By
              Attorneys

Patented Feb. 23, 1926.

1,574,082

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

TWO-RANGE TRANSMISSION MECHANISM.

Application filed May 19, 1924. Serial No. 714,250.

*To all whom it may concern:*

Be it known that I, JOHN C. HAGGART, Jr., a citizen of the United States, residing at Alma, in the county of Gratiot, State of Michigan, have invented certain new and useful Improvements in Two-Range Transmission Mechanism, of which the following is a specification, reference being had to the accompanying drawings.

This invention relates to a two-range transmission mechanism of that type wherein change speed and reverse gear mechanism permit of a wide range of speeds being attained, somewhat along the lines of combining two ordinary transmission mechanisms. In order to do this in a limited and compact space there must be a rearrangement of the gearing, and my invention aims to reduce the over-all dimension of a two-range transmission mechanism, by using a compound gear having internal and external gear portions. Associated with this internal and external gear wheel is a drive gear unit which is bodily removable relative to the remainder of the gearing.

My invention further aims to provide a transmission mechanism by which a multiplicity of speeds are detachable and wherein a compound gear is assembled in advance of a drive gear unit, with the remainder of the gearing compactly housed within a casing so that the complete transmission mechanism is applicable to various types of motor vehicles where a wide range of speeds is desirable and space limited for the employment of a transmission mechanism for such speed purposes.

From a manufacturing standpoint my transmission mechanism possesses other advantages, and reference will now be had to the drawings wherein Figure 1 is a vertical longitudinal sectional view of a transmission mechanism in accordance with my invention;

Figure 1:
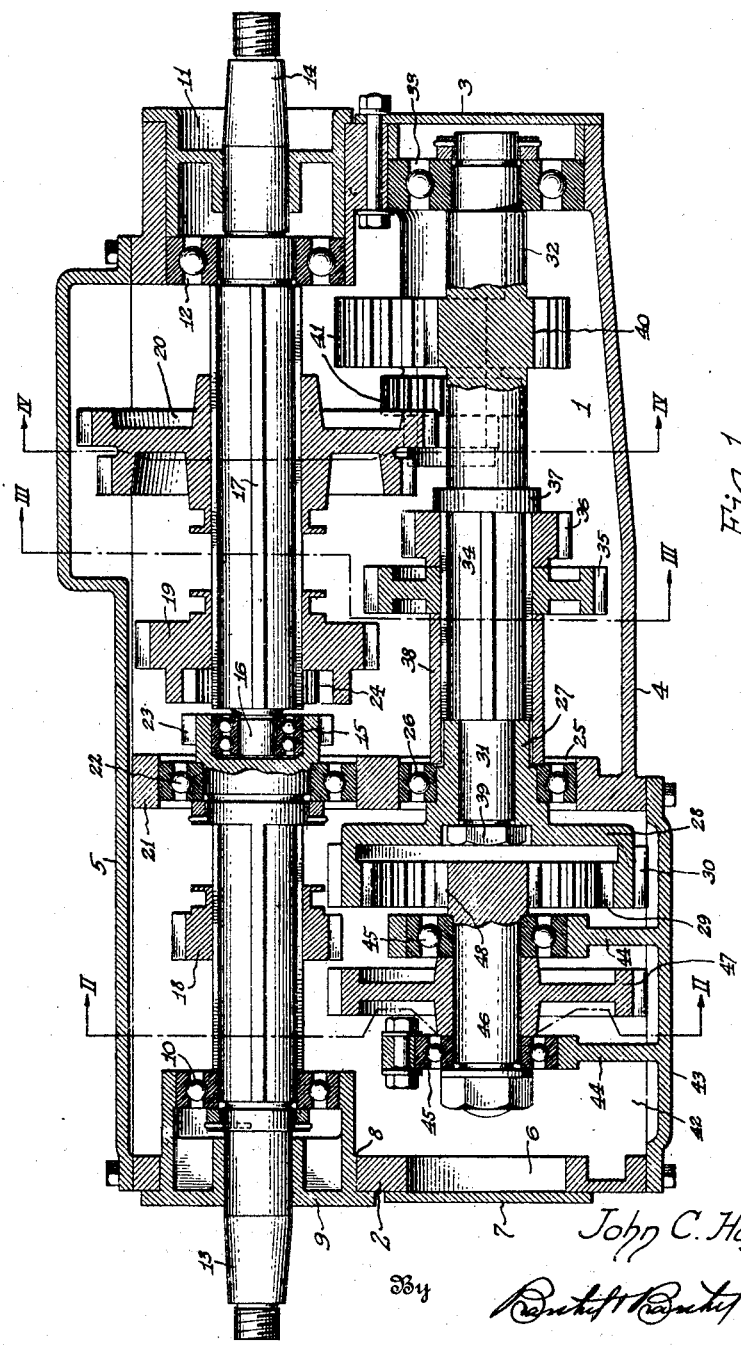
Figure 3:
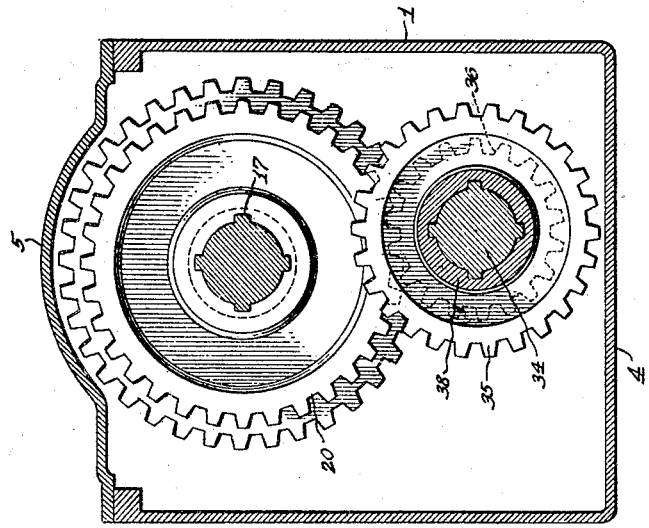
Fig. 3 is a similar view taken on the line III—III of Fig. 1.
Figure 2:
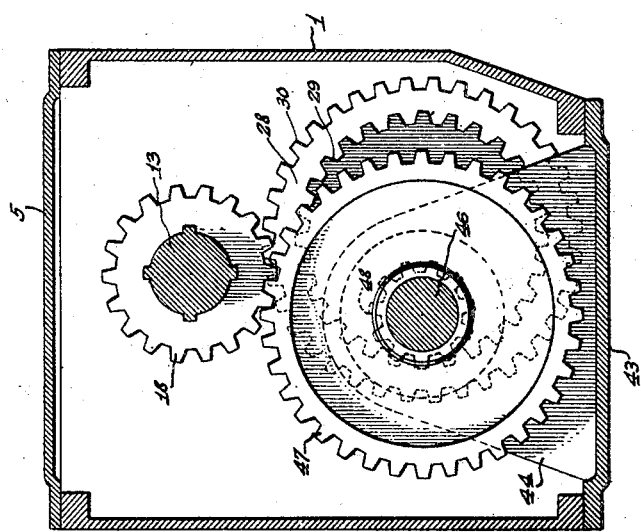
Fig. 2 is a cross sectional view taken on the line II—II of Fig. 1.
Figure 4:
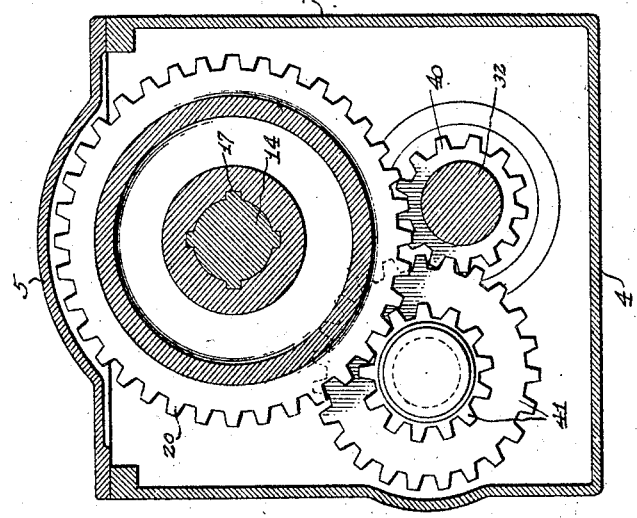
Fig. 4 is a similar view taken on the line IV—IV of Fig. 1.
Figure 5:
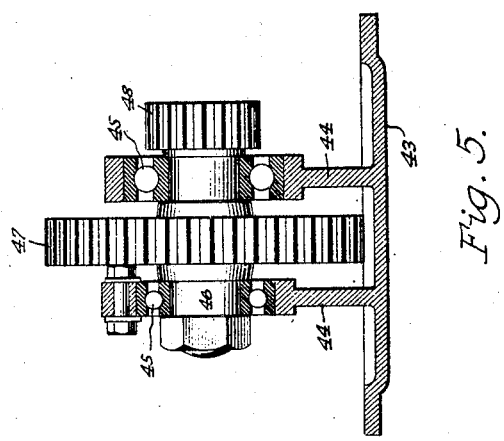
Fig. 5 is a vertical longitudinal sectional view of a detached drive gear unit.

In the drawing, the reference numeral 1 denotes a transmission casing having end walls 2 and 3, a bottom wall 4 and a detachable top wall 5.

The end wall 2 has a hand hole 6 normally closed by a plate 7 and a bearing opening 8 for a bearing cup 9 provided with an anti-frictional bearing 10. The bearing cup 9 and its bearing 10 longitudinally aline with another bearing cup 11 and a bearing 12 supported from the end wall 3 of the transmission casing, and journaled in said bearing cups and the anti-frictional bearings are longitudinally alining power shafts, one of which is designated 13 and may be conveniently considered as a drive shaft, while the other shaft is designated 14 and may be considered as a driven shaft. The confronting ends of said shafts are supported by the drive shaft 13 having an anti-frictional bearing 15 for the reduced end 16 of the shaft 14, and both of said shafts are provided with longitudinal splines or keys 17 for shiftable gears 18, 19 and 20. These shiftable gears may be shifted on their respective shafts by any well known type of gear shifting mechanism, and the shiftable gear 18 is located on the shaft 13, while the shiftable gears 19 and 20 are located on the shaft 14.

In the transmission casing is a partition 21 provided with an anti-frictional bearing 22 for the inner end of a shaft 13, this end of the shaft terminating in a gear wheel 23 adapted to be engaged by an internal gear wheel or rack 24 forming part of the shiftable gear wheel 19.

The partition 21 has an opening 25 for an anti-frictional bearing 26 and journaled in said bearing is the hub portion 27 of a compound gear 28 having an internal portion 29 and an external portion 30.

The hub portion 27 of the compound gear 28 serves as a bearing for the spindle or reduced end 31 of a countershaft 32 which has its opposite end journaled in an anti-frictional bearing 33 mounted in the casing 1 adjacent the end wall 3. The counter shaft 32 has a spline portion 34 for gear wheels 35 and 36, the latter abutting a collar 37 on the countershaft and the former being spaced from the bearing 26 by a sleeve 38. A nut 39 on the spindle or reduced end 31 of the countershaft holds the compound gear wheel 28 and the gear wheels 35 and 36 assembled relative to the counter shaft 32.

On the counter shaft 32 is a small gear wheel 40 adapted to mesh with the compound reverse gear 41 suitably supported in the transmission casing so that the compound shiftable gear wheel 20 may mesh with the reverse gear, as shown in Fig. 1, or may be shifted to mesh with the gear wheel 36.

The bottom wall 4 of the transmission casing 1 has an opening 42 normally closed by a plate 43 and on the plate 43 are spaced parallel supports 44 provided with anti-frictional bearings 45 for an auxiliary countershaft 46 having a large drive gear wheel 47 and a small drive wheel 48, the latter extending into the compound gear wheel 28 and meshing with the internal portion 29 thereof. The gear wheels 47 and 28 are positioned so that the driven shiftable gear wheel 18 may drive the gear wheel 47 or may be shifted into engagement with the external portion 30 of the compound gear wheel 28 to drive said gear wheel and transmit power to the countershaft 32.

It is by virtue of the removable top wall 5 that the greater part of the gearing may be assembled, but the compound gearing-wheel 28 is assembled relative to the countershaft 32 by entering said gear wheel through the opening 42 and manipulating the nut 39 through a hand opening 6. The bottom plate 43, carrying the gear unit, can then be placed in position and secured to the transmission casing, and it is obvious that the gear wheels 48 and 28 obviate the necessity of using a plurality of gear wheels for the transmission of power to the counter shaft at variable speeds, thus reducing the longitudinal dimension of the transmission mechanism.

As shown in Fig. 1, the drive shaft 13 is idling relative to the driven shaft 14 and the countershafts 32 and 46.

If the shiftable gear 19 is placed in engagement with the gear wheel 23 there will be a direct drive from the shaft 13 to the shaft 14, but for variable speeds the gear wheels 23 and 19 are separated and either of the gear wheels 18 or 20 shifted. With the gear wheel 18 in engagement with the gear wheel 47 there will be a lower speed than if the gear wheel 18 meshes with the external portion 30 of the compound gear wheel 28. Either of these two speeds may be transmitted from the countershaft 32 to the shaft 14 by shifting the gear wheel 19 into engagement with the gear wheel 35, for another speed, or shifting the gear wheel 20 into engagement with the gear wheel 36 for another speed, which incidentally would be the lowest speed when the gear wheel 18 meshes with the gear wheel 47 of the auxiliary countershaft 46.

For any of the speeds transmitted to the countershaft 32 reverse may be had through the reverse gear 41 and the shiftable gear 20, and it is now obvious that my transmission mechanism includes a wide range of speeds and all of this is attained by a very compact gear arrangement.

One embodiment of my invention has been illustrated, but it is to be understood that the structural elements are susceptible to such variations and modifications as fall within the scope of the appended claims.

What I claim is:—

1. In a power transmission, change speed and reverse gear mechanism wherein a plurality of speeds are attainable, a gearing comprising a driven shiftable gear, drive gears, and a compound gear having internal and external gear portions, one of said drive gears meshing with the internal portion of said compound gear, and said shiftable gear being adapted to mesh with the other drive gear or the external portion of said compound gear.

2. A power transmission, change speed and reverse gear mechanism as called for in claim 1, wherein said drive gears are assembled as a unit and bodily removable relatively to the remainder of the gearing.

3. In a power transmission, change speed and reverse gear mechanism wherein a plurality of speeds are attainable, a casing, gearing in said casing including drive gears, a driven gear adapted to mesh with one of said drive gears, a compound gear adapted to be driven by either the other drive gear or by said driven gear, and a plate detachably connected to said casing and supporting said drive gears.

4. In a change speed and reverse gear mechanism, the combination with a driven shaft, a shiftable gear thereon, and a countershaft, of a compound gear on said countershaft, said compound gear having an exterior portion engageable by said shiftable gear, said compound gear having an internal portion, a drive gear in said compound gear meshing with the internal portion thereof, and another drive gear operable with the first mentioned drive gear and engageable by said shiftable gear.

5. The combination called for in claim 4, wherein said drive gears are supported as a removable unit.

In testimony whereof I affix my signature.

JOHN C. HAGGART, Jr.